(12) United States Patent
Li et al.

(10) Patent No.: US 8,861,212 B2
(45) Date of Patent: Oct. 14, 2014

(54) PORTABLE COMPUTER DEVICE AND SCREW ROD DEVICE

(75) Inventors: Bo-Yi Li, New Taipei (TW); Chia-lian Yen, New Taipei (TW)

(73) Assignee: Wistron Corporation, New Taipei (TW)

( * ) Notice: Subject to any disclaimer, the term of this patent is extended or adjusted under 35 U.S.C. 154(b) by 296 days.

(21) Appl. No.: 13/610,148

(22) Filed: Sep. 11, 2012

(65) Prior Publication Data

US 2013/0312549 A1    Nov. 28, 2013

(30) Foreign Application Priority Data

May 22, 2012  (TW) .............................. 101118260 A

(51) Int. Cl.
*H05K 5/00*          (2006.01)
(52) U.S. Cl.
USPC .......................................... 361/755; 361/728
(58) Field of Classification Search
USPC ............... 361/728–730, 755; 17/18.2, 23–26, 17/89.34
See application file for complete search history.

(56) References Cited

U.S. PATENT DOCUMENTS

| 4,946,300 | A | * | 8/1990 | Makita ........................... 400/682 |
| 5,015,930 | A | * | 5/1991 | Kikuta et al. .................. 318/466 |
| 5,102,084 | A | | 4/1992 | Park |
| 5,566,424 | A | * | 10/1996 | Crompton et al. ............... 16/342 |
| 5,715,138 | A | * | 2/1998 | Choi .......................... 361/679.21 |
| 8,707,516 | B2 | * | 4/2014 | Koyama et al. ................. 16/223 |
| 8,782,853 | B2 | * | 7/2014 | Ge .................................. 16/354 |

FOREIGN PATENT DOCUMENTS

| CN | 101727123 A | 6/2010 |
| TW | M243748 U | 9/2004 |

OTHER PUBLICATIONS

Taiwan Patent Office, Office Action issued on Jun. 23, 2014.

\* cited by examiner

*Primary Examiner* — Hung S Bui
(74) *Attorney, Agent, or Firm* — Rabin & Berdo, P.C.

(57) ABSTRACT

A portable computer device and a screw rod device are provided. The portable computer device includes a computer body, a display, a support member and a screw rod structure. The support member is rotatably connected to the computer body and the display respectively. The screw rod structure is disposed in the computer body, and includes a fixing base, a free gear, a screw rod, a transmission gear and a driving gear. The fixing base has an accommodating portion and a connecting portion, and is connected to the display through the connecting portion. The free gear is disposed in the accommodating portion and screwed to the screw rod. The driving gear drives the free gear through the transmission gear, so that the free gear moves along an axial direction of the screw rod, thereby pushing the fixing base to adjust an included angle between the display and the computer body.

20 Claims, 12 Drawing Sheets

PORTABLE COMPUTER DEVICE AND SCREW ROD DEVICE

CROSS-REFERENCES TO RELATED APPLICATIONS

This non-provisional application claims priority under 35 U.S.C. §119(a) on Patent Application No. 101118260 filed in Taiwan, R.O.C. on May 22, 2012, the entire contents of which are hereby incorporated by reference.

BACKGROUND OF THE INVENTION

1. Technical Field

The present invention relates to a portable computer device and a screw rod device, and more particularly to a portable computer device and a screw rod device that uses a screw rod to adjust an included angle between a computer body (a first case), and a display (a second case).

2. Related Art

With the popularization of touch technology, an operating system supporting touch technology, together with accessory software and hardware thereof, has been adopted in more and more portable computer devices. However, in a conventional portable computer, when a display is rotated relative to a computer body the display is fixed at a certain angle only by means of a frictional force or an elastic force provided by a pivoting structure. Therefore, during a touch operation of a user, the display is unstable, causing inconvenience to the user during operation.

Another practice is to dispose a support structure at a rear side surface of the display. When the display is rotated to a specific angle, a bottom side of the display may abut against a groove of the computer body, and the rear side surface of the display is supported by a support member. In this way, the display does not shake violently during touch operation by the user.

However, in this practice, it is usually restricted that the user should rotate the display to a specific angle, so that the bottom side of the display abuts against the groove of the computer body before the user starts the touch operation. In addition, the bottom side of the display merely abuts against the computer body, and no physical connection is generated. As a result, when the user performs the touch operation, the display inevitably shakes, and the overall stability is still inadequate.

SUMMARY

The present invention provides a portable computer device, which includes a computer body, a display, a support member and a screw rod structure. The computer body has a first side edge. The display has a rear side surface and a second side edge. The support member has a first connecting portion and a second connecting portion opposite the first connecting portion. The support member is rotatably connected to the first side edge through the first connecting portion, and is rotatably connected to the rear side surface of the display through the second connecting portion. The screw rod structure is disposed in the computer body, and includes a fixing base, a free gear, a screw rod, a transmission gear and a driving gear. The fixing base has an accommodating portion and a connecting portion. The fixing base is connected to the second side edge of the display through the connecting portion. The free gear is disposed in the accommodating portion, and is provided with a tapped hole in the center of the free gear. The screw rod has an external thread corresponding to the tapped hole. The screw rod passes through the accommodating portion and is screwed to the tapped hole of the free gear through the external thread. The transmission gear has two opposite ends, in which one end is engaged with the free gear. The driving gear is engaged with the other end of the transmission gear. The driving gear drives the free gear through the transmission gear, so that the free gear is rotated and moves along an axial direction of the screw rod, thereby pushing the fixing base to adjust an included angle between the display and the computer body.

The present invention also provides a screw rod device, including a first case, a second case, a support member and a screw rod structure. The first case has a first side edge. The second case has a rear side surface and a second side edge. The support member has a first connecting portion and a second connecting portion opposite the first connecting portion. The support member is rotatably connected to the first side edge through the first connecting portion, and is rotatably connected to the rear side surface of the second case through the second connecting portion. The screw rod structure is disposed in the first case, and includes a fixing base, a free gear, a screw rod, a transmission gear and a driving gear. The fixing base has an accommodating portion and a connecting portion. The fixing base is connected to the second side edge of the second case through the connecting portion. The free gear is disposed in the accommodating portion, and is provided with a tapped hole in the center of the free gear. The screw rod has an external thread corresponding to the tapped hole. The screw rod passes through the accommodating portion and is screwed to the tapped hole of the free gear through the external thread. The transmission gear has two opposite ends, in which one end is engaged with the free gear. The driving gear is engaged with the other end of the transmission gear. The driving gear drives the free gear through the transmission gear, so that the free gear is rotated and moves along an axial direction of the screw rod, thereby pushing the fixing base to adjust an included angle between the second case and the first case.

In conclusion, the present invention provides a portable computer device that uses the foregoing screw rod structure to adjust the included angle between the display and the computer body, and provides a screw rod device that uses the foregoing screw rod structure to adjust the included angle between the first case and the second case.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
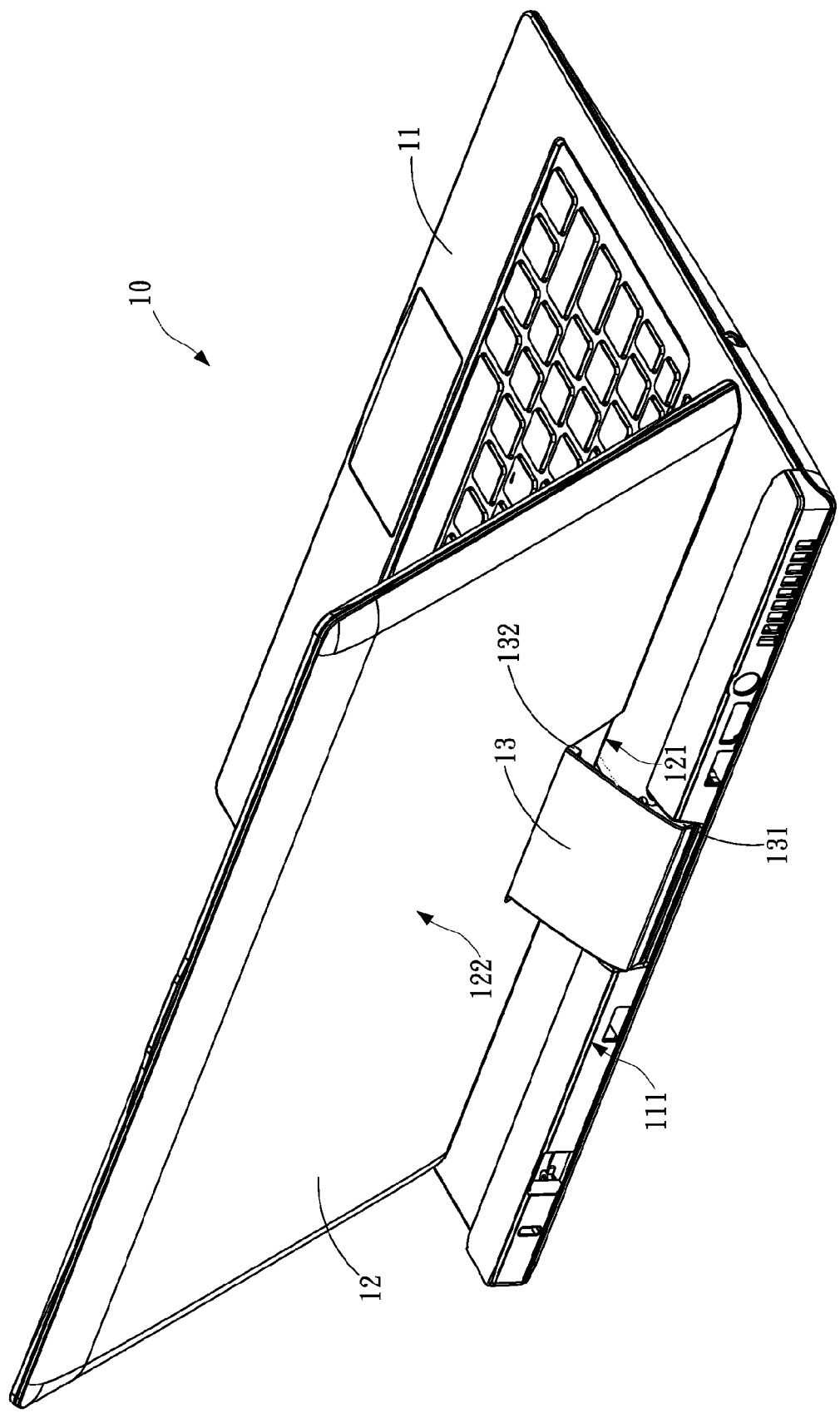
FIG. 1 is a first schematic view of a first embodiment of the present invention.
Figure 2:
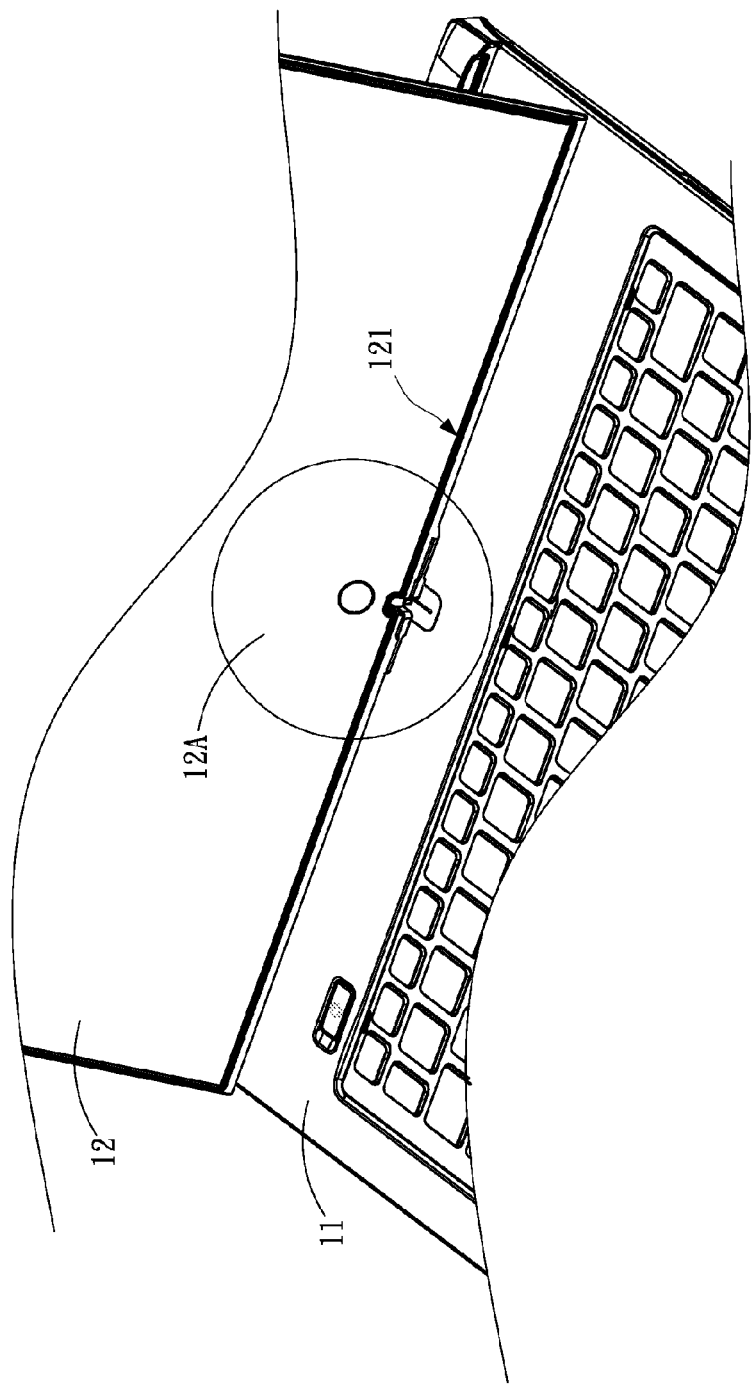
FIG. 2 is a second schematic view of a first embodiment of the present invention.

Please refer to FIG. 1 to FIG. 4, in which a portable computer device 10 is disclosed. The portable computer device 10 includes a computer body 11, a display 12, a support member 13 and a screw rod structure 14. The computer body 11 has a first side edge 111. The display 12 has a second side edge 121 and a rear side surface 122. The support member 13 has a first joint portion 131 and a second joint portion 132 opposite the first joint portion 131. The support member 13 is rotatably connected to the first side edge 111 of the computer body 11 through the first joint portion 131, and is rotatably connected to the rear side surface 122 of the display 12 through the second joint portion 132. When the display 12 is rotated relative to the computer body 11, the support member 13 is used to support the display 12 from the rear side surface 122 of the display 12.

Figure 5:
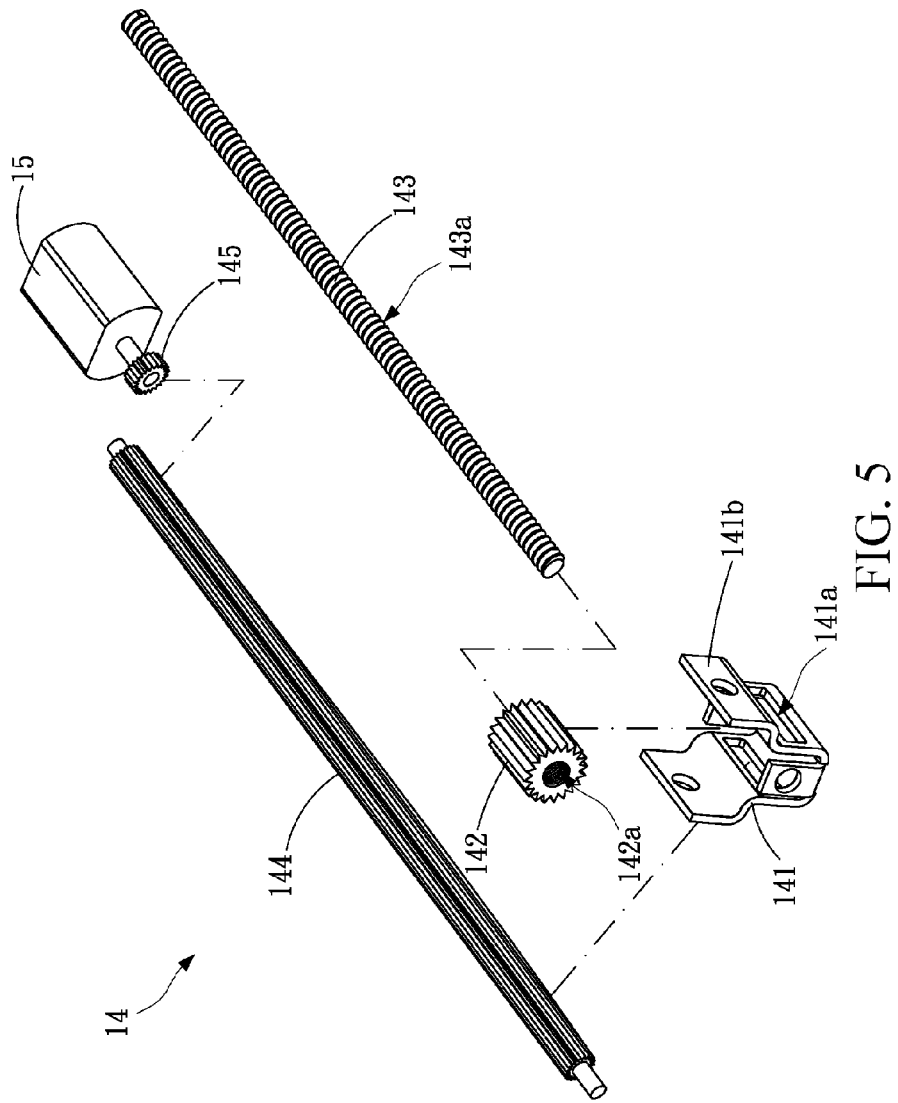
FIG. 5 is an exploded view of a screw rod structure according to an embodiment of the present invention.
Figure 6:
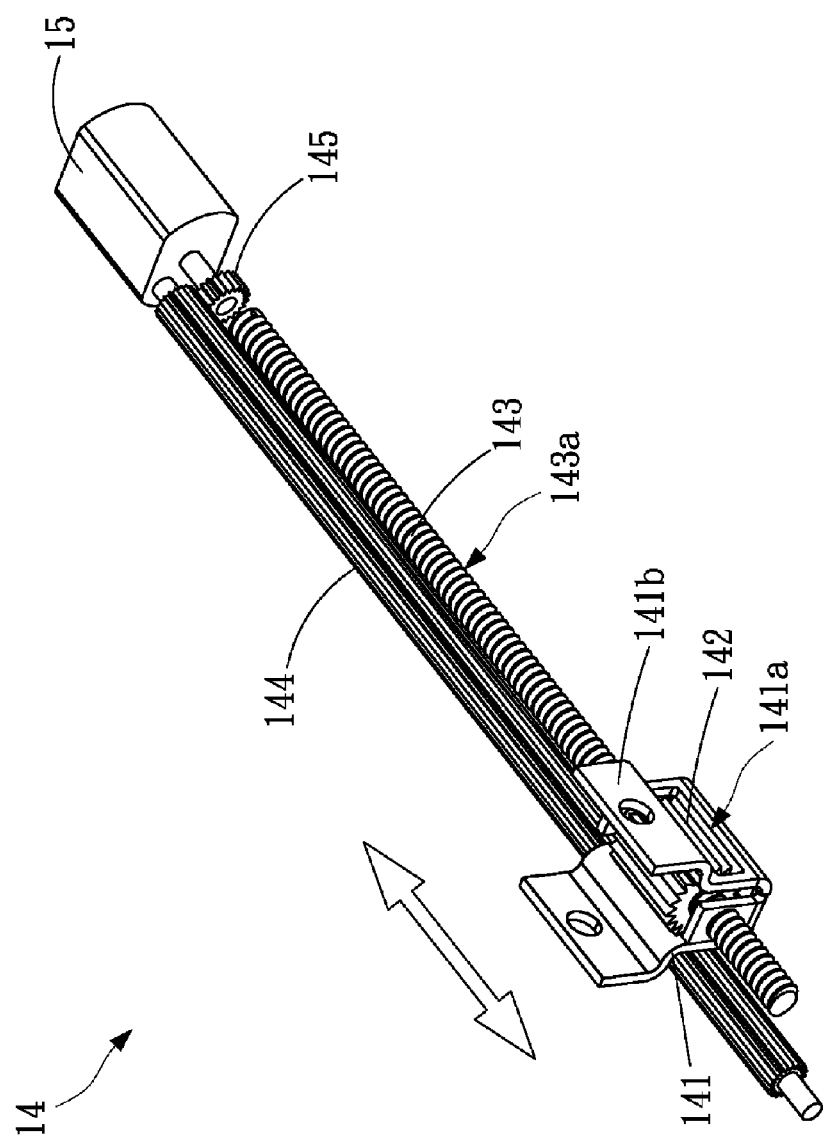
FIG. 6 is an assembly view of a screw rod structure according to an embodiment of the present invention.

Please refer to FIG. 5 and FIG. 6, in which the screw rod structure 14 is disposed in the computer body 11, and includes a fixing base 141, a free gear 142, a screw rod 143, a transmission gear 144 and a driving gear 145.

The fixing base 141 serves as a bridge connecting the display 12 and the screw rod 143, and has an accommodating portion 141a and a connecting portion 141b. The fixing base 141 is connected to the second side edge 121 of the display 12 through the connecting portion 141b.

The free gear 142 is disposed in the accommodating portion 141a of the fixing base 141, and is provided with a tapped hole 142a in the center of the free gear 142.

The screw rod 143 has an external thread 143a corresponding to the tapped hole 142a. When the free gear 142 is disposed in the accommodating portion 141a of the fixing base 141, the screw rod 143 passes through the accommodating portion 141a of the fixing base 141, and is screwed to the tapped hole 142a of the free gear 142 through the external thread 143a.

At this time, the connecting portion 141b of the fixing base 141 is already connected to the second side edge 121 of the display 12, the accommodating portion 141a of the fixing base 141 is already connected to the screw rod 143, and an included angle between the display 12 and the computer body 11 can be changed just by moving the fixing base 141 along an axial direction of the screw rod 143. The technical means for moving the fixing base 141 along the axial direction of the screw rod 143 is further described hereinafter.

As shown in FIG. 5 and FIG. 6, the transmission gear 144 has two opposite ends, in which one end is engaged with the free gear 142, and the other end is engaged with the driving gear 145. In an implementation aspect, the driving gear 145 drives the free gear 142 through a rod-shaped transmission gear 144, so that the free gear 142 is rotated. Since the tapped hole 142a of the free gear is engaged with the external thread 143a of the screw rod 143, the free gear 142 moves along the axial direction of the screw rod 143, thereby pushing the fixing base 141 to adjust the included angle between the display 12 and the computer body 11.

In an implementation aspect, the portable computer device 10 further includes a motor 15, which is connected to the driving gear 145 and used to drive the driving gear 145 to rotate. The driving gear 145 then drives the free gear 142 through the transmission gear 144, so that the free gear 142 is rotated and moves along the axial direction of the screw rod 143, thereby pushing the fixing base 141 to adjust the included angle between the display 12 and the computer body 11. The motor 15 may be electrically connected to a circuit of the portable computer device 10, so that a user may control the motor 15 through an operating system, thereby controlling the included angle between the display 12 and the computer body 11. In addition, the motor 15 may be switched on and off under the control of an independent button.

In an implementation aspect, the computer body 11 has an opening 112, which is correspondingly disposed above the screw rod 143. The connecting portion 141b of the fixing base 141 includes a connecting arm 141c, and the connecting arm 141c has a joint end 141d. The connecting arm 141c passes through the opening 112 and is rotatably connected to the second side edge 121 of the display 12 through the joint end 141d. In an implementation aspect, the joint end 141d of the connecting arm 141c is connected to a pivot disposed on the second side edge 121.

Figure 3:
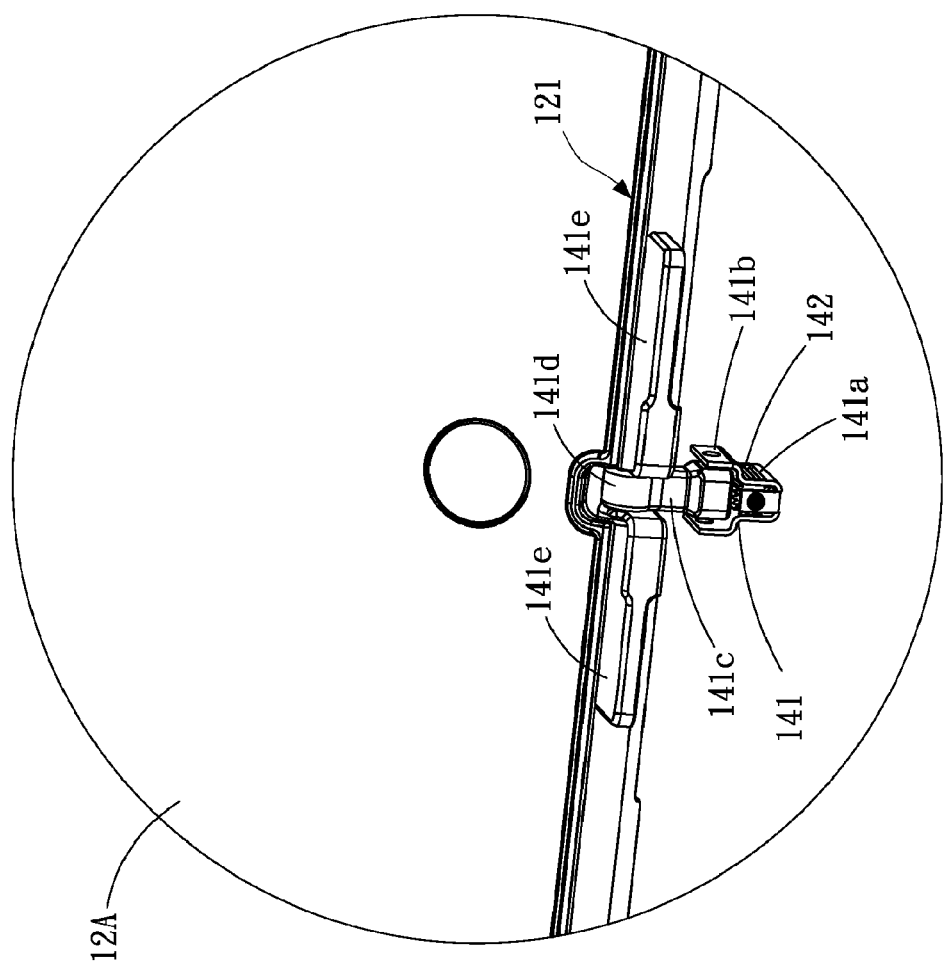
FIG. 3 is a partial enlarged view of a region 12A in FIG. 2, where a computer body is removed.
Figure 4:
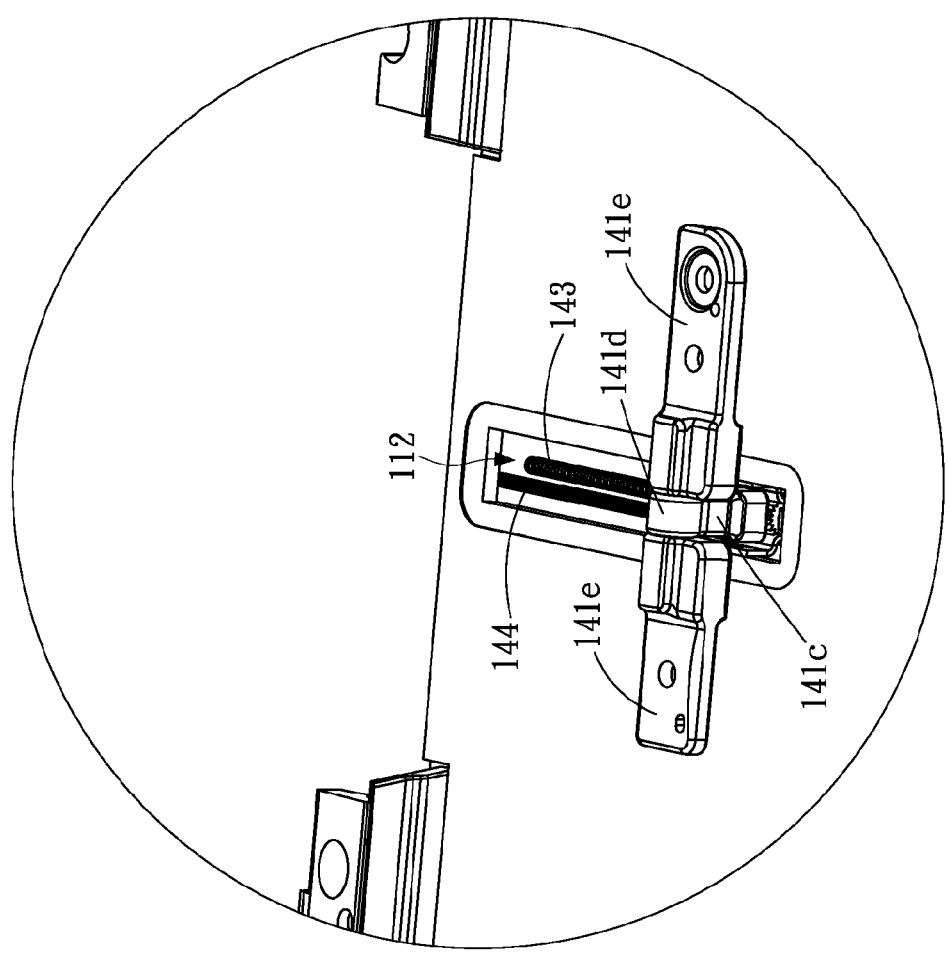
FIG. 4 is a partial enlarged view of a region 12A in FIG. 2, where a display is removed.

Further Please refer to FIG. 3 and FIG. 4, in which in an implementation aspect, the connecting portion 141b of the fixing base 141 further includes abutting members 141e which are extended at two sides of the joint end 141d and abut against the second side edge 121 of the display 12. The abutting members 141e can disperse an acting force between the pivot of the display 12 and the joint end 141d. Meanwhile, a gap is maintained between the abutting members 141e and an upper surface of the computer body 11. In this way, when the second side edge 121 of the display 12 moves on the upper surface of the computer body 11, the second side edge 121 does not scratch the surface of the computer body 11.

Figure 7:
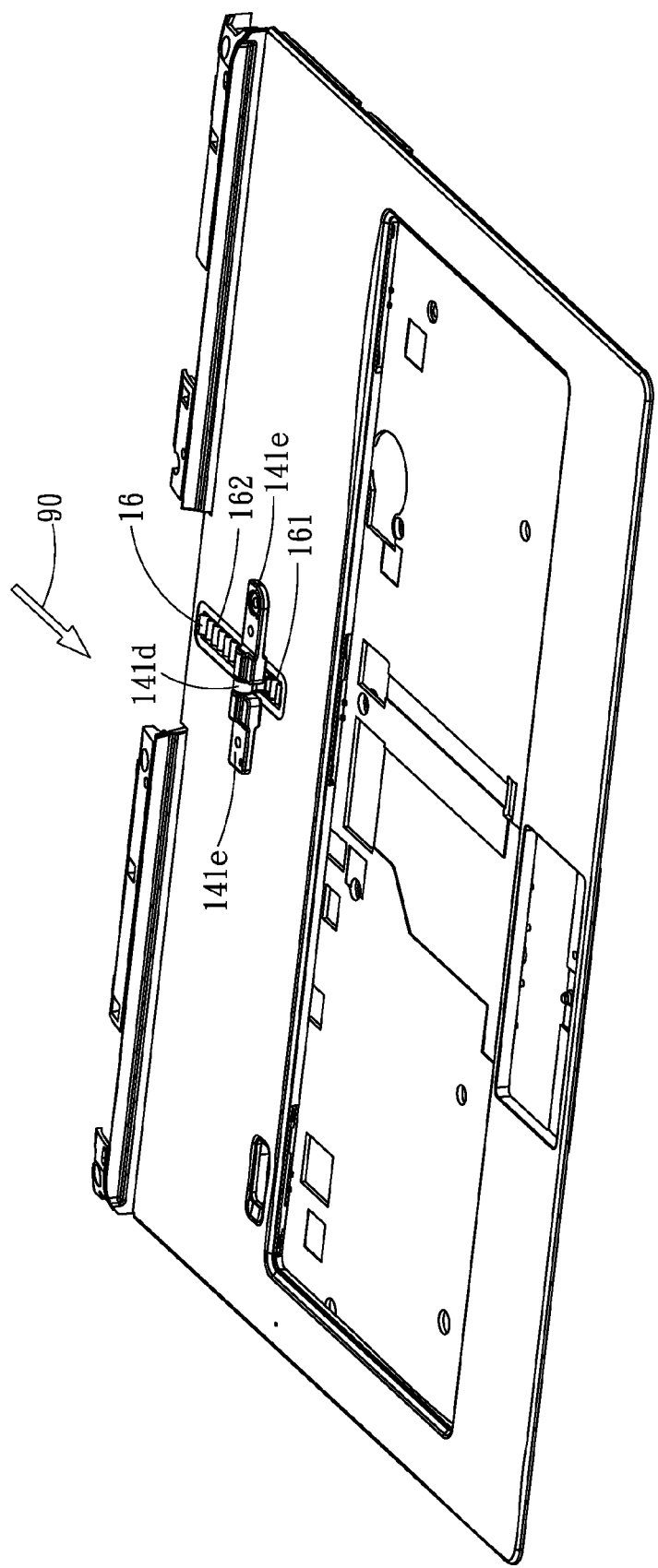
FIG. 7 is a first schematic view of a part of components according to a first embodiment of the present invention.

Please refer to FIG. 7, in which in an implementation aspect, the portable computer device 10 further includes a dust cover 16, which is connected to the fixing base 141 and covers the opening 112 of the computer body 11, so as to prevent external dust and foreign matter from falling into the computer body 11. The dust cover 16 includes a first part 161 and a second part 162, which are respectively connected to two sides of the fixing base 141. When the fixing base 141 moves along a first direction 90, the first part 161 is folded and the second part 162 is unfolded. When the fixing base 141 moves along a direction opposite the first direction 90, the first part 161 is unfolded and the second part 162 is folded. In this way, no matter which place the fixing base 141 moves to, it is guaranteed that the opening 112 is covered by the dust cover 16.

Figure 8:
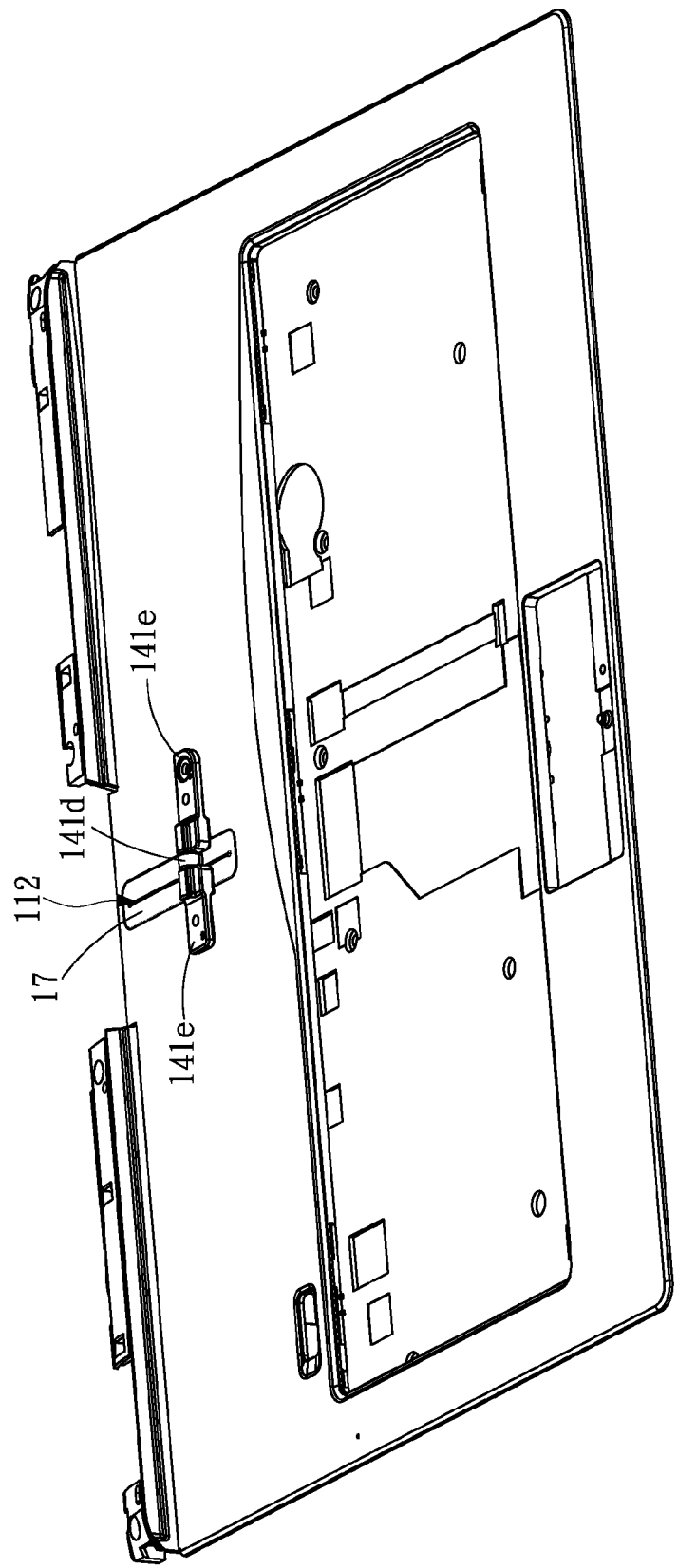
FIG. 8 is a second schematic view of a part of components according to a first embodiment of the present invention.
Figure 9:
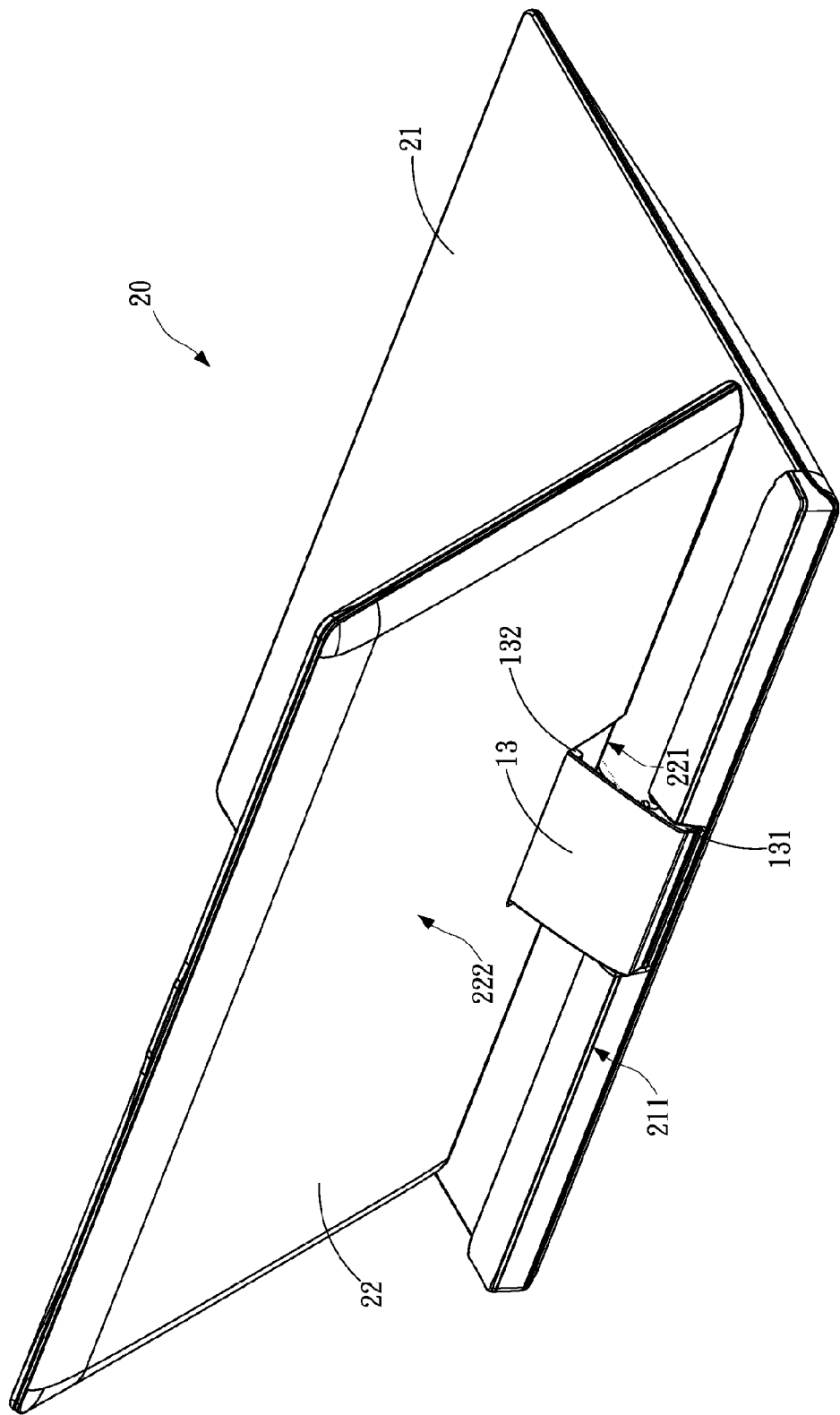
FIG. 9 is a first schematic view of a second embodiment of the present invention.
Figure 10:
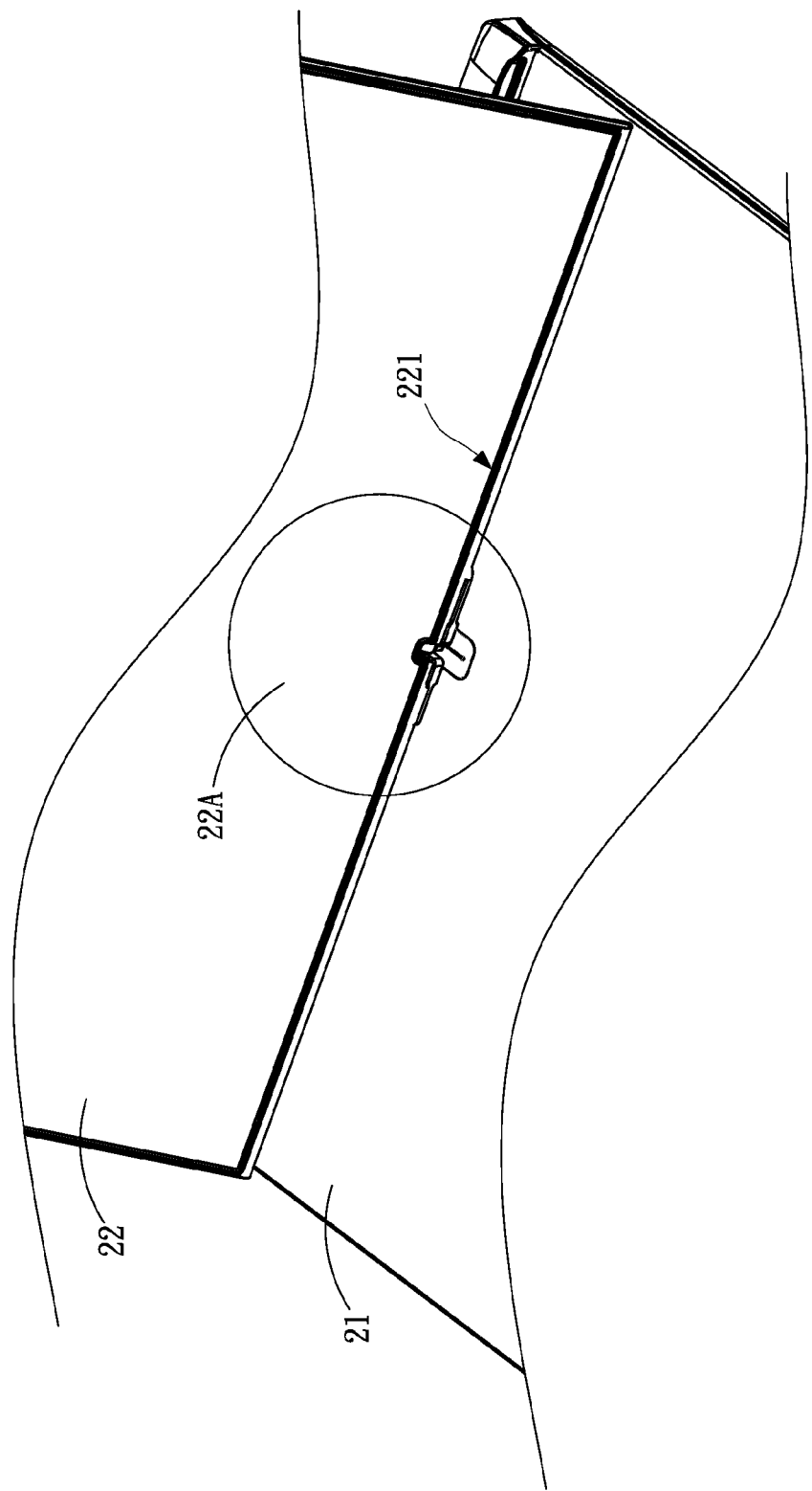
FIG. 10 is a second schematic view of a second embodiment of the present invention.

Please refer to FIG. 8, in which in an implementation aspect, the dust cover is an elastic membrane 17. The elastic membrane 17 has a slit 171, so that the connecting arm 141c passes through the slit 171 and moves along a length direction of the slit 171. The elastic membrane 17 may be Mylar, which can be adhered to the connecting arm 141c, so that dust or foreign matter does not fall into the computer body 11 through the opening 112.

In an implementation aspect, a length of the transmission gear 144 is greater than that of the screw rod 143. If the length of the transmission gear 144 is less than that of the screw rod 143, the free gear 142 may move to a position in which the free gear 142 is not engaged with the transmission gear 144, leading to a situation that a driving force from the driving gear 145 fails to be transmitted to the free gear 142.

In an implementation aspect, the screw rod 143 is perpendicular to the first side edge 111 of the computer body 11. In this way, the second side edge 121 of the display 12 can move along a direction perpendicular to the first side edge 111 of the computer body 11.

In conclusion, in the portable computer device 10 disclosed in the foregoing embodiment, the included angle between the display 12 and the computer body 11 is adjusted through the axial movement of the free gear 142 on the screw rod 143.

Please refer to FIG. 9 to FIG. 12, in which a screw rod device 20 is disclosed. The screw rod device 20 includes a first case 21, a second case 22, a support member 13 and a screw rod structure 14. The first case 21 has a first side edge 211. The second case 22 has a second side edge 221 and a rear side surface 222. The support member 13 has a first joint portion 131 and a second joint portion 132 opposite the first joint portion 131. The support member 13 is rotatably connected to the first side edge 211 of the first case 21 through the first joint portion 131, and is rotatably connected to the rear side surface 222 of the second case 22 through the second joint portion 132. When the second case 22 is rotated relative to the first case 21, the support member 13 is used to support the second case 22 from the rear side surface 222 of the second case 22.

Please refer to FIG. 5 and FIG. 6, in which the screw rod structure 14 is disposed in the first case 21, and includes a fixing base 141, a free gear 142, a screw rod 143, a transmission gear 144 and a driving gear 145.

The fixing base 141 serves as a bridge connecting the second case 22 and the screw rod 143, and has an accommodating portion 141a and a connecting portion 141b. The fixing base 141 is connected to the second side edge 221 of the second case 22 through the connecting portion 141b.

The free gear 142 is disposed in the accommodating portion 141a of the fixing base 141, and is provided with a tapped hole 142a in the center of the free gear 142.

The screw rod 143 has an external thread 143a corresponding to the tapped hole 142a. When the free gear 142 is disposed in the accommodating portion 141a of the fixing base 141, the screw rod 143 passes through the accommodating portion 141a of the fixing base 141, and is screwed to the tapped hole 142a of the free gear 142 through the external thread 143a.

At this time, the connecting portion 141b of the fixing base 141 is already connected to the second side edge 221 of the second case 22, the accommodating portion 141a of the fixing base 141 is already connected to the screw rod 143, and an included angle between the second case 22 and the first case 21 can be changed just by moving the fixing base 141 along an axial direction of the screw rod 143. The technical means for moving the fixing base 141 along the axial direction of the screw rod 143 is further described hereinafter.

As shown in FIG. 5 and FIG. 6, the transmission gear 144 has two opposite ends, in which one end is engaged with the free gear 142, and the driving gear 145 is engaged with the other end of the transmission gear 144. In an implementation aspect, the driving gear 145 drives the free gear 142 through the transmission gear 144, so that the free gear 142 is rotated and moves along the axial direction of the screw rod 143, thereby pushing the fixing base 141 to adjust the included angle between the second case 22 and the first case 21.

In an implementation aspect, the screw rod device 20 further includes a motor 15, which is connected to the driving gear 145 and used to drive the driving gear 145 to rotate. The driving gear 145 then drives the free gear 142 through the transmission gear 144, so that the free gear 142 is rotated and moves along the axial direction of the screw rod 143, thereby pushing the fixing base 141 to adjust the included angle between the second case 22 and the first case 21.

In an implementation aspect, the first case 21 has an opening 212, which is correspondingly disposed above the screw rod 143. The connecting portion 141b of the fixing base 141 includes a connecting arm 141c, and the connecting arm 141c has a joint end 141d. The connecting arm 141c passes through the opening 212 and is rotatably connected to the second side edge 221 of the second case 22 through the joint end 141d.

Figure 11:
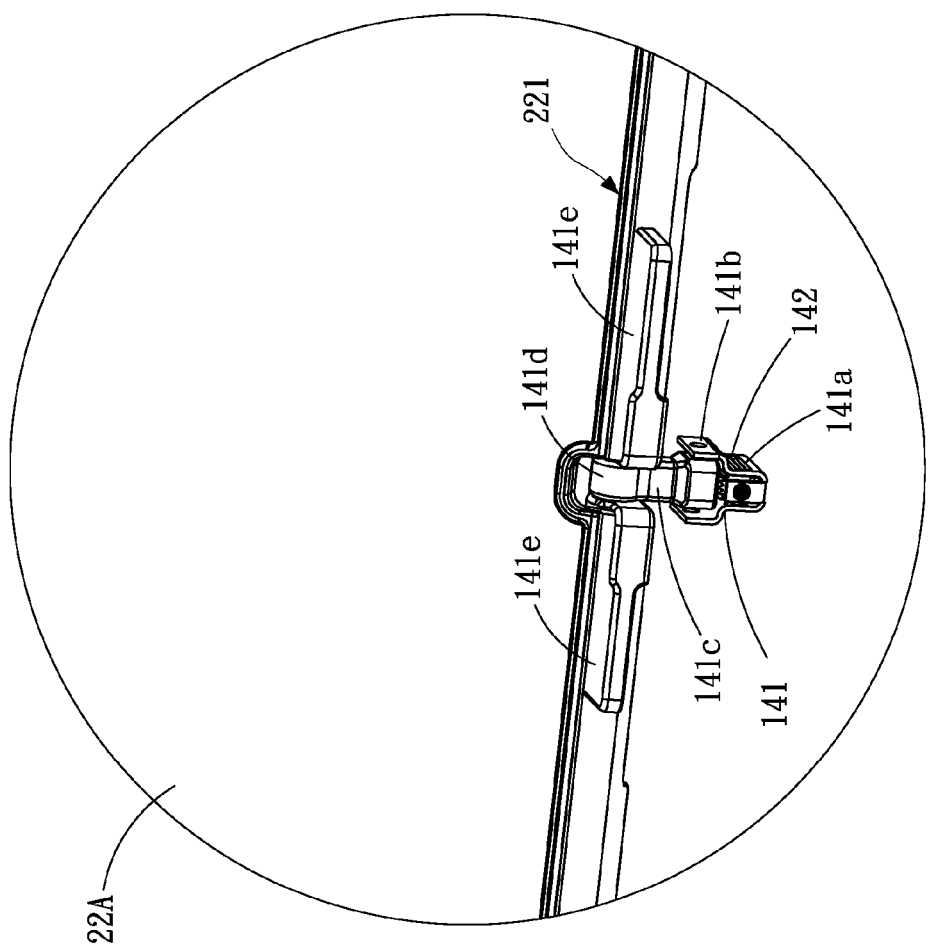
FIG. 11 is a partial enlarged view of a region 22A in FIG. 10, where a first case is removed.
Figure 12:
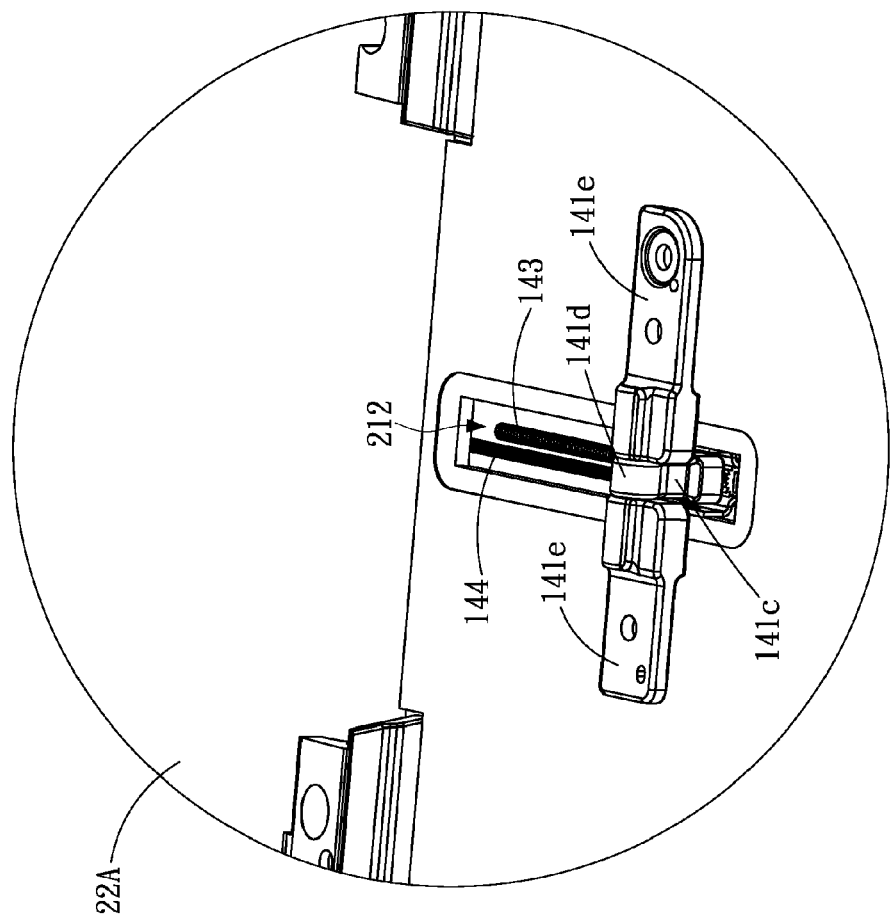
FIG. 12 is a partial enlarged view of a region 22A in FIG. 10, where a second case is removed.

Further Please refer to FIG. 11 and FIG. 12, in which in an implementation aspect, the connecting portion 141b of the fixing base 141 further includes abutting members 141e which are extended at two sides of the joint end 141d and abut against the second side edge 221 of the second case 22.

In an implementation aspect, the screw rod device 20 further includes a dust cover 16 as shown in FIG. 7. The dust cover 16 is connected to the fixing base 141 and covers the opening 212 of the first case 21, so as to prevent external dust and foreign matter from falling into the first case 21. The dust cover 16 includes a first part 161 and a second part 162, which are respectively connected to two sides of the fixing base 141. When the fixing base 141 moves along a first direction 90, the first part 161 is folded and the second part 162 is unfolded. When the fixing base 141 moves along a direction opposite the first direction 90, the first part 161 is unfolded and the second part 162 is folded. In this way, no matter which place the fixing base 141 moves to, it is guaranteed that the opening 212 is covered by the dust cover 16.

In an implementation aspect, the dust cover is an elastic membrane 17 as shown in FIG. 8. The elastic membrane 17 has a slit 171, so that the connecting arm 141c passes through the slit 171 and moves along a length direction of the slit 171. The elastic membrane 17 may be Mylar, which can be adhered to the connecting arm 141c, so that dust or foreign matter does not fall into the first case 21 through the opening 212.

In an implementation aspect, a length of the transmission gear 144 is greater than that of the screw rod 143. If the length of the transmission gear 144 is less than that of the screw rod 143, the free gear 142 may move to a position in which the free gear 142 is not engaged with the transmission gear 144, leading to a situation that a driving force from the driving gear 145 fails to be transmitted to the free gear 142.

In an implementation aspect, the screw rod 143 is perpendicular to the first side edge 211 of the first case 21. In this way, the second side edge 221 of the second case 22 can move along a direction perpendicular to the first side edge 211.

In conclusion, in the screw rod device 20 disclosed in the foregoing embodiment, the included angle between the second case 22 and the first case 21 is adjusted through the axial movement of the free gear 142 on the screw rod 143. Therefore, any device having the first case 21 and the second case 22 can utilize the foregoing screw rod structure 14 to adjust the included angle between the first case 21 and the second case 22.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A portable computer device, comprising:
a computer body, having a first side edge;
a display, having a second side edge and a rear side surface;

a support member, having a first joint portion and a second joint portion opposite the first joint portion, wherein the support member is rotatably connected to the first side edge through the first joint portion, and is rotatably connected to the rear side surface through the second joint portion; and a screw rod structure, disposed in the computer body and comprising:
- a fixing base, having an accommodating portion and a connecting portion, wherein the fixing base is connected to the second side edge of the display through the connecting portion;
- a free gear, disposed in the accommodating portion, and provided with a tapped hole in the center of the free gear;
- a screw rod, having an external thread corresponding to the tapped hole, wherein the screw rod passes through the accommodating portion and is screwed to the tapped hole of the free gear through the external thread;
- a transmission gear, having two opposite ends, wherein one end is engaged with the free gear; and
- a driving gear, engaged with the other end of the transmission gear, wherein the driving gear drives the free gear through the transmission gear, so that the free gear is rotated and moves along an axial direction of the screw rod, thereby pushing the fixing base to adjust an included angle between the display and the computer body.

2. The portable computer device according to claim 1, further comprising a motor, connected to the driving gear and used to drive the driving gear to rotate.

3. The portable computer device according to claim 2, wherein the computer body has an opening correspondingly disposed above the screw rod.

4. The portable computer device according to claim 3, wherein the connecting portion comprises a connecting arm, the connecting arm has a joint end, and the connecting arm passes through the opening and is rotatably connected to the second side edge through the joint end.

5. The portable computer device according to claim 4, further comprising a dust cover, connected to the fixing base and covering the opening.

6. The portable computer device according to claim 5, wherein the dust cover comprises a first part and a second part respectively connected to two sides of the fixing base, when the fixing base moves along a first direction, the first part is folded and the second part is unfolded, and when the fixing base moves along a direction opposite the first direction, the first part is unfolded and the second part is folded.

7. The portable computer device according to claim 4, wherein the connecting portion further comprises an abutting member, extended at two sides of the joint end and abutting against the second side edge of the display.

8. The portable computer device according to claim 5, wherein the dust cover is an elastic membrane, and has a slit for the connecting arm to pass through.

9. The portable computer device according to claim 1, wherein a length of the transmission gear is greater than that of the screw rod.

10. The portable computer device according to claim 1, wherein the screw rod is perpendicular to the first side edge of the computer body.

11. A screw rod device, comprising:
a first case, having a first side edge;
a second case, having a second side edge and a rear side surface;
a support member, having a first joint portion and a second joint portion opposite the first joint portion, wherein the support member is rotatably connected to the first side edge through the first joint portion, and is rotatably connected to the rear side surface through the second joint portion; and
a screw rod structure, disposed in the first case and comprising:
- a fixing base, having an accommodating portion and a connecting portion, wherein the fixing base is connected to the second side edge of the second case through the connecting portion;
- a free gear, disposed in the accommodating portion, and provided with a tapped hole in the center of the free gear;
- a screw rod, having an external thread corresponding to the tapped hole, wherein the screw rod passes through the accommodating portion and is screwed to the tapped hole of the free gear through the external thread;
- a transmission gear, having two opposite ends, wherein one end is engaged with the free gear; and
- a driving gear, engaged with the other end of the transmission gear, wherein the driving gear drives the free gear through the transmission gear, so that the free gear is rotated and moves along an axial direction of the screw rod, thereby pushing the fixing base to adjust an included angle between the second case and the first case.

12. The screw rod device according to claim 11, further comprising a motor, connected to the driving gear and used to drive the driving gear to rotate.

13. The screw rod device according to claim 12, wherein the first case has an opening correspondingly disposed above the screw rod.

14. The screw rod device according to claim 13, wherein the connecting portion comprises a connecting arm, the connecting arm has a joint end, and the connecting arm passes through the opening and is rotatably connected to the second side edge through the joint end.

15. The screw rod device according to claim 14, further comprising a dust cover, connected to the fixing base and covering the opening.

16. The screw rod device according to claim 15, wherein the dust cover comprises a first part and a second part respectively connected to two sides of the fixing base, when the fixing base moves along a first direction, the first part is folded and the second part is unfolded, and when the fixing base moves along a direction opposite the first direction, the first part is unfolded and the second part is folded.

17. The screw rod device according to claim 14, wherein the connecting portion further comprises an abutting member, extended at two sides of the joint end and abutting against the second side edge of the second case.

18. The screw rod device according to claim 15, wherein the dust cover is an elastic membrane, and has a slit for the connecting arm to pass through.

19. The screw rod device according to claim 11, wherein a length of the transmission gear is greater than that of the screw rod.

20. The screw rod device according to claim 11, wherein the screw rod is perpendicular to the first side edge of the first case.

* * * * *